Patented Oct. 9, 1934

1,976,127

UNITED STATES PATENT OFFICE 1,976,127

METHOD OF ACTIVATING ADSORBENT EARTHS OR CLAYS

Frederick W. Huber, Riverside, Calif.

No Drawing. Application April 5, 1932, Serial No. 603,452

6 Claims. (Cl. 252—2)

This invention relates to the preparation or treatment of adsorbent earths or clays, and particularly to the acid treatment or activation of such materials, either for the purpose of imparting bleaching or adsorbent properties to an earth or clay, such as a hydrous aluminum silicate, or a decomposition product of feldspar, which naturally possesses little or none of such properties, or for the purpose of increasing the natural adsorbent power of certain earths or clays, such as fuller's earth. The term "earth" will be used hereinafter, throughout the specification and appended claims, to include any such earth or clay.

The principal object of the present invention is to provide a simpler and more economical method of effecting such treatment. More specifically, it is an object of this invention to acid treat or activate an earth in such manner that the water soluble products formed by the action of the acid thereon may be separated from the remaining insoluble portion of the earth by a simple filtering operation instead of requiring the laborious and time-consuming steps of settling, thickening, or decantation, such as are necessary in the methods now commonly employed.

The so-called "activation" of bleaching or decolorizing earths by treatment with acid apparently depends upon the decomposition of a portion of the silicates present therein, resulting in the conversion of oxides of alkali and alkaline earth metals, and of some of the ferric oxide and alumina, present therein, to the form of water soluble salts of the acid used, and the removal of such salts from the remaining portion, including insoluble products formed by the acid treatment. The amount of material to be extracted varies with different earths and with the amount of activation desired. This treatment appears to alter the physical structure of the material as well as the chemical composition thereof, or to modify the surface characteristics thereof in some way, so as to give it the desired adsorptive properties.

The method commonly used for this purpose consists in suspending the earth in a predetermined amount of aqueous solution of an acid, digesting or agitating the mixture at or near the boiling temperature for a period sufficient to effect the desired activation, then separating the solution from the treated earth and washing the same, as by means of counter-current decantation, until substantially free from soluble salts and acid, and then drying. Although this treatment is comparatively simple, it becomes quite costly and time-consuming when practiced on a large scale, due to the fact that the highly colloidal nature of the insoluble material resulting from such treatment makes it extremely slow filtering and difficult to wash on a filter, and relatively slow and cumbersome methods of separation and washing, such as settling, thickening, or decantation, have to be employed. The treatment of the earth in suspension in aqueous solution of acid appears to form a product having the properties of a hydrated gel, extremely slow-filtering and hard to wash.

I have found, however, that if the earth, after crushing or grinding to a coarse granular state of division, and preferably in a substantially air dry condition, is first treated with an appropriate amount of concentrated or strong acid to the consistency of a damp sand or granular mixture, and the mass then heated or allowed to stand in the substantial absence of added water, the product is still of a granular nature, apparently due to a partial or complete coagulation of the colloidal reaction products, resulting from the substantial absence of added water and the drying action of the acid, and also of the heat if such is used. Upon subsequent mixing with water, the salts formed by the acid treatment go into solution rapidly, while the undissolved material retains its relatively coarse granular nature and can be easily and quickly separated from the solution, preferably by filtering and water-washing on a continuous mechanical filter or other filtering apparatus, or by centrifugal action or settling. According to the present invention, therefore, the treatment is carried out in this manner, resulting in a considerable saving in time, labor and equipment.

The earth used may, for example, be a hydrous aluminum silicate, such as montmorillonite, kaolinite, decomposed feldspar, or wacke. This earth is preferably first crushed or ground to suitable fineness, preferably to fairly coarse granular condition, for example about 10 mesh, and is preferably air dried, or otherwise partially dried, although the degree of drying at this stage is not critical. It is then mixed with a suitable proportion of acid sufficient to effect the desired activation, for example, from 5% to 35% of its weight of concentrated acid. I prefer to use sulphuric acid, because of its low cost and also because of the drying action thereof, although good results may also be obtained with other acids, such as hydrochloric or sulphurous acid. In any event the amount of acid used should be only such amount as will form with the earth a more or less damp or moist granular mass, rather than a suspension of the earth in a fluid medium. The acid and earth are thoroughly and uniformly mixed, and are allowed to remain in contact, preferably at a temperature above atmospheric temperature, for a sufficient length of time to cause the desired activation, and preferably for a sufficient period to permit substantially complete reaction of the acid. In some cases, particularly when the amount of acid used does not exceed about 10% of the weight of the air-dry earth, it is not necessary to heat the mixture of earth and it is sufficient to merely allow the mixture to stand, with or without continued agitation, for a suitable period, for example, from one to several hours. In general, however, and particularly when the proportion of acid exceeds about 10%, I prefer to heat the mixture for a suitable period, for example, from half an hour or less to two hours or more, with or without agitation, at a temperature somewhat above atmospheric temperature and preferably at a temperature above the boiling point of water and below that of the acid used. For example, when sulphuric acid is used, the temperature may be between 100° C. and 330° C., but is preferably between 150° C. and 300° C. If desired, this treatment may be conducted under pressure, in a suitable closed vessel, which may, if desired, be provided with valved outlet means for escape of water vapor at the pressure desired.

The mass, which still retains, to a considerable degree at least, its relatively coarse granular condition, is then mixed with water, preferably while still hot, and may be agitated or stirred for a sufficient time to dissolve the soluble salts contained therein. The amount of water used may vary considerably, but should be sufficient to dissolve all the soluble salts, and preferably sufficient to form a thin pulp or slurry. If desired, the mixture may be heated to a moderate temperature during this leaching operation, and said operation may also be conducted under pressure, as in an autoclave, if desired. Also, instead of directly mixing the hot granular material with water, it may be stored, and subsequently lixiviated with water at any time, as it does not appear to deteriorate on storage. This is of economic advantage where the supply of raw material is not continuous.

The mixture, after lixiviation is complete, is then subjected to a separating and washing operation to separate the solution from the treated earth and to substantially remove all salts and acid therefrom. Even after lixiviation with water, the earth retains a granular nature, due apparently to the fact that the insoluble products of the acid treatment are in a coagulated or only slightly hydrated condition and the granular particles, therefore, are much less subject to disintegration or "sliming" upon mixing with water than is the case when the initial acid treatment is conducted in a relatively dilute solution, as has heretofore been the common method of procedure. For this reason, the separating and washing may readily be effected by filtration followed by washing of the filter-cake with water, although other methods, such as counter-current decantation, may also be used. In case a filter is used, the free filtering and easy washing qualities of the granular material are of great advantage, while if decantation or similar means are employed, the relatively good settling properties thereof are also advantageous.

The treated, separated and washed earth is then dried by heating to a suitable temperature, preferably not exceeding 150° C., and is finally ground to the desired fineness, for example, to a fineness of from 75% to 100% minus 200 mesh, and is then ready to be used, stored or packed for shipment.

As a specific example of the application of my invention, I take an air-dried earth, such as montmorillonite, and mix it with about 25% of its weight of concentrated sulphuric acid in a suitable acid-proof mixer, such as a screw conveyor. This mixture is then passed through a rotary dryer whose temperature is maintained, for example, at about 150-300° C., said dryer being so designed as to require, for example, from one to two hours for passage of the material therethrough. The dried material, while still hot, is then mixed with about 2 or 3 parts of hot water to 1 part of earth, and is then filtered and washed. The filter cake is discharged from the filter, and is dried at a temperature of about 140° C., and then ground, for example, to a fineness of about 90-95% through 200 mesh. The product thus formed is found to possess much greater decolorizing or adsorbent properties than the original earth.

I claim:

1. The method of activating adsorbent earths which comprises mixing an earth with concentrated sulphuric acid in an amount equal to from 5% to 35% of the weight of said earth, heating said mixture to a temperature of 150 and 300° C. to obtain reaction of said sulphuric acid with constituents of said earth and to also partially dry said earth and the products of such reaction by the combined effect of heating and the dehydrating action of the sulphuric acid, then bringing the resultant mixture into contact with water to dissolve soluble salts therefrom, separating the solution from the undissolved earth, and then drying said earth.

2. The method as set forth in claim 1, in which the separation of the solution from the undissolved earth is effected by subjecting the mixture to a filtering operation.

3. The method of activating adsorbent earths which comprises mixing a raw earth with concentrated acid in an amount equal to from 5% to 35% of the weight of said earth, heating said mixture in the substantial absence of added water to a temperature of 150 to 300° C. to obtain reaction of said acid with constituents of said earth, then bringing the resulting mixture into contact with water to dissolve soluble salts therefrom, separating the solution from the undissolved earth and then drying said earth.

4. The method as set forth in claim 3, in which the separation of the solution from the undissolved earth is effected by subjecting the mixture to a filtering operation.

5. The method of activating adsorbent earths which comprises mixing a raw earth with concentrated acid in such proportions as to form a damp granular mass, heating said earth and acid in contact in the substantial absence of added water to a temperature of 100° to 330° C. for a period of time sufficient to permit reaction of said acid on said earth, then bringing the resulting granular mass into contact with water to dissolve soluble salts therefrom, separating the resulting solution from the undissolved earth, and then drying said earth.

6. The method set forth in claim 5 in which the separation of the solution from the undissolved earth is effected by subjecting the mixture to a filtering operation.

FREDERICK W. HUBER.